United States Patent
Watanabe

(10) Patent No.: US 9,749,989 B2
(45) Date of Patent: Aug. 29, 2017

(54) BASE STATION APPARATUS AND METHOD FOR DELIVERING MULTICAST SIGNAL

(75) Inventor: Teruyoshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 428 days.

(21) Appl. No.: 13/026,611

(22) Filed: Feb. 14, 2011

(65) Prior Publication Data

US 2011/0235564 A1    Sep. 29, 2011

(30) Foreign Application Priority Data

Mar. 29, 2010    (JP) .................................. 2010-074854

(51) Int. Cl.
  *H04W 4/06*    (2009.01)
  *H04W 72/00*   (2009.01)

(52) U.S. Cl.
  CPC ................................ *H04W 72/005* (2013.01)

(58) Field of Classification Search
  CPC .......................... H04W 72/005; H04L 12/185
  USPC ................................... 370/312, 252; 709/206
  See application file for complete search history.

(56) References Cited

U.S. PATENT DOCUMENTS

| | | | | |
|---|---|---|---|---|
| 7,457,288 B2 * | 11/2008 | Park et al. | .................... | 370/390 |
| 7,710,917 B2 | 5/2010 | Kato | | |
| 2003/0109216 A1 * | 6/2003 | Kim | .................. | H04W 76/002 455/3.01 |
| 2003/0157899 A1 * | 8/2003 | Trossen | ................ | H04L 1/0002 455/69 |
| 2003/0185233 A1 | 10/2003 | Ji et al. | | |
| 2004/0185837 A1 * | 9/2004 | Kim et al. | .................. | 455/414.3 |
| 2007/0156815 A1 * | 7/2007 | Mate et al. | ..................... | 709/204 |
| 2007/0165551 A1 * | 7/2007 | Proctor et al. | ................ | 370/312 |
| 2007/0171865 A1 | 7/2007 | Kato | | |
| 2007/0205775 A1 | 9/2007 | Voelkel et al. | | |
| 2008/0186913 A1 * | 8/2008 | Ahn | ...................... | H04L 12/185 370/329 |
| 2008/0212583 A1 * | 9/2008 | Rey et al. | ..................... | 370/390 |

(Continued)

FOREIGN PATENT DOCUMENTS

| | | |
|---|---|---|
| EP | 2046090 | 4/2009 |
| EP | 2239968 | 10/2010 |

(Continued)

OTHER PUBLICATIONS

Notification of Reason for Refusal dated Jun. 25, 2013, from corresponding Japanese Application No. 2010-074854.

(Continued)

*Primary Examiner* — Khaled Kassim
*Assistant Examiner* — Zhaohui Yang
(74) *Attorney, Agent, or Firm* — Katten Muchin Rosenman LLP

(57) ABSTRACT

A base station apparatus includes a receiver, a transmitter, a determiner, and an instruction sender. The receiver receives a multicast signal. The transmitter transmits the multicast signal to a mobile station apparatus. The determiner determines, in accordance with a status of communication with the mobile station apparatus, whether the transmission of the multicast signal is needed. The instruction sender transmits, in accordance with a result of the determination, an instruction signal indicating whether to join a group of destinations of the multicast signal to a distribution apparatus for distributing the multicast signal.

2 Claims, 14 Drawing Sheets

(56) References Cited

U.S. PATENT DOCUMENTS

| | | | |
|---|---|---|---|
| 2008/0267109 A1* | 10/2008 | Wang et al. | 370/312 |
| 2009/0046614 A1 | 2/2009 | Lewis et al. | |
| 2009/0213810 A1* | 8/2009 | Shousterman | H04W 88/182 370/331 |
| 2010/0039977 A1 | 2/2010 | Hikari et al. | |
| 2010/0097958 A1* | 4/2010 | Yi et al. | 370/254 |
| 2010/0110905 A1* | 5/2010 | An et al. | 370/252 |
| 2010/0232340 A1* | 9/2010 | Godor et al. | 370/312 |
| 2011/0080861 A1* | 4/2011 | Fischer et al. | 370/312 |
| 2011/0116433 A1* | 5/2011 | Dorenbosch | 370/312 |
| 2012/0023178 A1* | 1/2012 | Drevon et al. | 709/206 |

FOREIGN PATENT DOCUMENTS

| | | |
|---|---|---|
| JP | 2003-23428 | 1/2003 |
| JP | 2004-228885 | 8/2004 |
| JP | 2007-195046 | 8/2007 |
| JP | 2007-533220 | 11/2007 |
| JP | 2008-289162 | 11/2008 |
| JP | 2009-246845 | 10/2009 |
| WO | 2007/084809 | 7/2007 |
| WO | 2009/096305 | 8/2009 |

OTHER PUBLICATIONS

Notification of Reason for Refusal dated Oct. 1, 2013, from corresponding Japanese Application No. 2010-074854.

Communication pursuant to Article 94(3) EPC dated Apr. 30, 2015, from corresponding EPC Application No. 11154789.9.

Extended European Search Report dated Aug. 18, 2014, from the corresponding European Patent Application No. 11154789.9.

* cited by examiner

| CELL ⌐251 | IP ADDRESS ⌐252 | GROUP ⌐253 | DELIVERY STATUS ⌐254 |
|---|---|---|---|
| CELL_1 | aaa | AAA | DELIVERING |
| CELL_1 | bbb | BBB | DELIVERING |
| CELL_2 | ccc | CCC | NOT DELIVERING |
| CELL_3 | ddd | DDD | NOT DELIVERING |
| CELL_4 | eee | EEE | NOT DELIVERING |
| CELL_5 | fff | FFF | NOT DELIVERING |
| CELL_6 | ggg | GGG | NOT DELIVERING |

FIG. 9

| MOBILE STATION (255) | IP ADDRESS (252) | GROUP (253) | DELIVERY STATUS (254) |
|---|---|---|---|
| UE_1 | aaa | AAA | DELIVERING |
| UE_1 | bbb | BBB | DELIVERING |
| UE_2 | ccc | CCC | NOT DELIVERING |
| UE_3 | ddd | DDD | NOT DELIVERING |
| UE_4 | eee | EEE | NOT DELIVERING |
| UE_5 | fff | FFF | NOT DELIVERING |
| UE_6 | ggg | GGG | NOT DELIVERING |

FIG. 13

BASE STATION APPARATUS AND METHOD FOR DELIVERING MULTICAST SIGNAL

CROSS-REFERENCE TO RELATED APPLICATION

This application is based upon and claims the benefit of priority of the prior Japanese Patent Application No. 2010-074854, filed on Mar. 29, 2010, the entire contents of which are incorporated herein by reference.

FIELD

The embodiments discussed herein are related to techniques for multicast delivery to mobile station apparatuses.

BACKGROUND

Currently, the Internet Protocol (IP) has been employed for radio communication, and multicast delivery from a base station apparatus to mobile station apparatuses has been proposed.

For example, a mobile communication system has been proposed, which includes mobile terminals and a multicast router. The mobile terminals belong to a multicast group, and the multicast router transmits information signals to the mobile terminals that belong to the multicast group. Each of the mobile terminals includes: means for transmitting, to the multicast router, a request for establishing a multicast path; a timer for counting a time period that is shorter than a time interval at which the multicast router transmits a presence confirmation request; means for activating the timer when the request for establishing a multicast path is transmitted and whenever the mobile terminal receives the information signal from the multicast router; and means for transmitting, to the multicast router, a request for leaving the multicast group to which the mobile terminal belongs when the time period expires. The multicast router includes means for disconnecting the multicast path in response to the request (for leaving the multicast group) transmitted from any of the mobile terminals when any other mobile terminal does not belong to the multicast group.

In addition, a mobile computing apparatus has been proposed, which migrates across link technologies connected to an apparatus on an IP-based subnet while maintaining on-going communication. The mobile computing apparatus includes: a link migration module that selects a link and notifies an interested host of a media access control (MAC) address of the selected link; and a dynamic MAC to IP binding module that may dynamically replace a first MAC address bound to an IP address with a second MAC address of the selected link.

Japanese Laid-open Patent Publication No. 2004-228885 and Japanese Laid-open Patent Publication No. 2008-289162 disclose related techniques.

SUMMARY

According to an aspect of the present invention, provided is a base station apparatus including a receiver, a transmitter, a determiner, and an instruction sender. The receiver receives a multicast signal. The transmitter transmits the multicast signal to a mobile station apparatus. The determiner determines, in accordance with a status of communication with the mobile station apparatus, whether the transmission of the multicast signal is needed. The instruction sender transmits, in accordance with a result of the determination, an instruction signal indicating whether to join a group of destinations of the multicast signal to a distribution apparatus for distributing the multicast signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a parameter table according to an embodiment of the present invention;

FIG. 13 is a diagram illustrating an example of a parameter table according to an embodiment of the present invention.

DESCRIPTION OF EMBODIMENTS

There have been no rules for flow control of IP packet signals in the base station apparatuses. Thus, when transmission of user data to a mobile station apparatus is restricted, delivery of a multicast signal is not stopped until an apparatus that delivers the multicast signal detects an abnormality of delivery in the mobile station apparatus that is a destination of the multicast signal.

According to the embodiments, it is possible to accelerate the delivery control of multicast signals transmitted to mobile station apparatuses.

Figure 1:
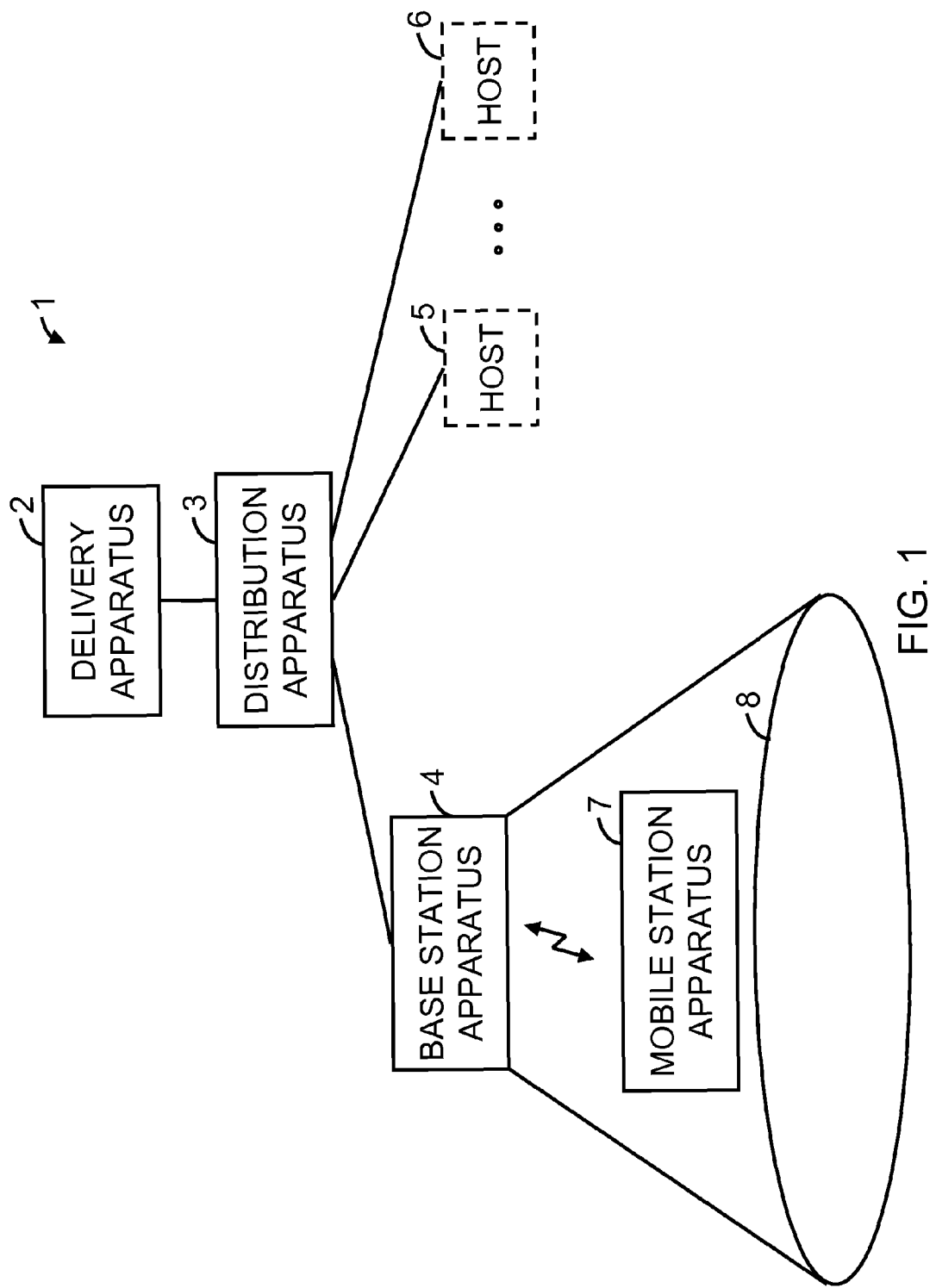
FIG. 1 is a diagram illustrating an exemplary configuration of a communication system according to an embodiment of the present invention.

Embodiments will be discussed below with reference to the accompanying drawings. FIG. 1 illustrates an exemplary configuration of a communication system according to the present embodiment. A communication system 1 includes a delivery apparatus 2, a distribution apparatus 3, a base station apparatus 4, hosts 5 and 6 and a mobile station apparatus 7.

The delivery apparatus 2 delivers a multicast signal to the distribution apparatus 3. The delivery apparatus 2 is an information processing apparatus such as a personal computer or a work station, for example. The delivery apparatus 2 may deliver, to the distribution apparatus 3, a multicast packet as the multicast signal.

The distribution apparatus 3 receives the multicast signal from the delivery apparatus 2 and copies the multicast signal. The distribution apparatus 3 transmits the multicast signal to destination apparatuses included in a group of destinations of the multicast signal. In the example illustrated in FIG. 1, the multicast signal is transmitted to the base station apparatus 4 and the hosts 5 and 6.

When the base station apparatus 4 receives the multicast signal to be transmitted to the mobile station apparatus 7 located within a cell 8 covered by the base station apparatus 4, the base station apparatus 4 transmits the received multicast signal to the mobile station apparatus 7.

A transmission equipment and a network may be provided between the delivery apparatus 2 and the distribution apparatus 3 to transfer a signal between the delivery apparatus 2 and the distribution apparatus 3. Similarly, a transmission equipment and a network may be provided between the distribution apparatus 3 and the base station apparatus 4 and between the distribution apparatus 3 and each of the hosts 5 and 6. When a signal to be transferred is a packet signal, the transmission equipments may be routers. In the following discussion, apparatuses included in the communication system 1 and located on the side of the delivery apparatus 2 with respect to one apparatus included in the communication system 1 may be called upstream apparatuses of the one apparatus.

When the third generation mobile communication system is employed in the communication system, the distribution apparatus 3 may be provided in a gateway general packet radio service (GPRS) support node (GGSN), an upstream apparatus of the GGSN, or an upstream apparatus of a radio network controller (RNC). In addition, functions (discussed later) of the base station apparatus 4 may be provided by a base station apparatus Node-B or the RNC.

When the long term evolution (LTE) is employed in the communication system 1, the distribution apparatus 3 may be provided in a serving gateway (S-GW) or an upstream apparatus of the S-GW, or between the base station apparatus eNodeB (eNB) and the S-GW.

When the Worldwide Interoperability for Microwave Access (WiMAX) is employed in the communication system 1, the distribution apparatus 3 may be provided in an access service network (ASN) gateway or an upstream apparatus of the ASN gateway, or between the ASN gateway and the base station apparatus.

Figure 2:
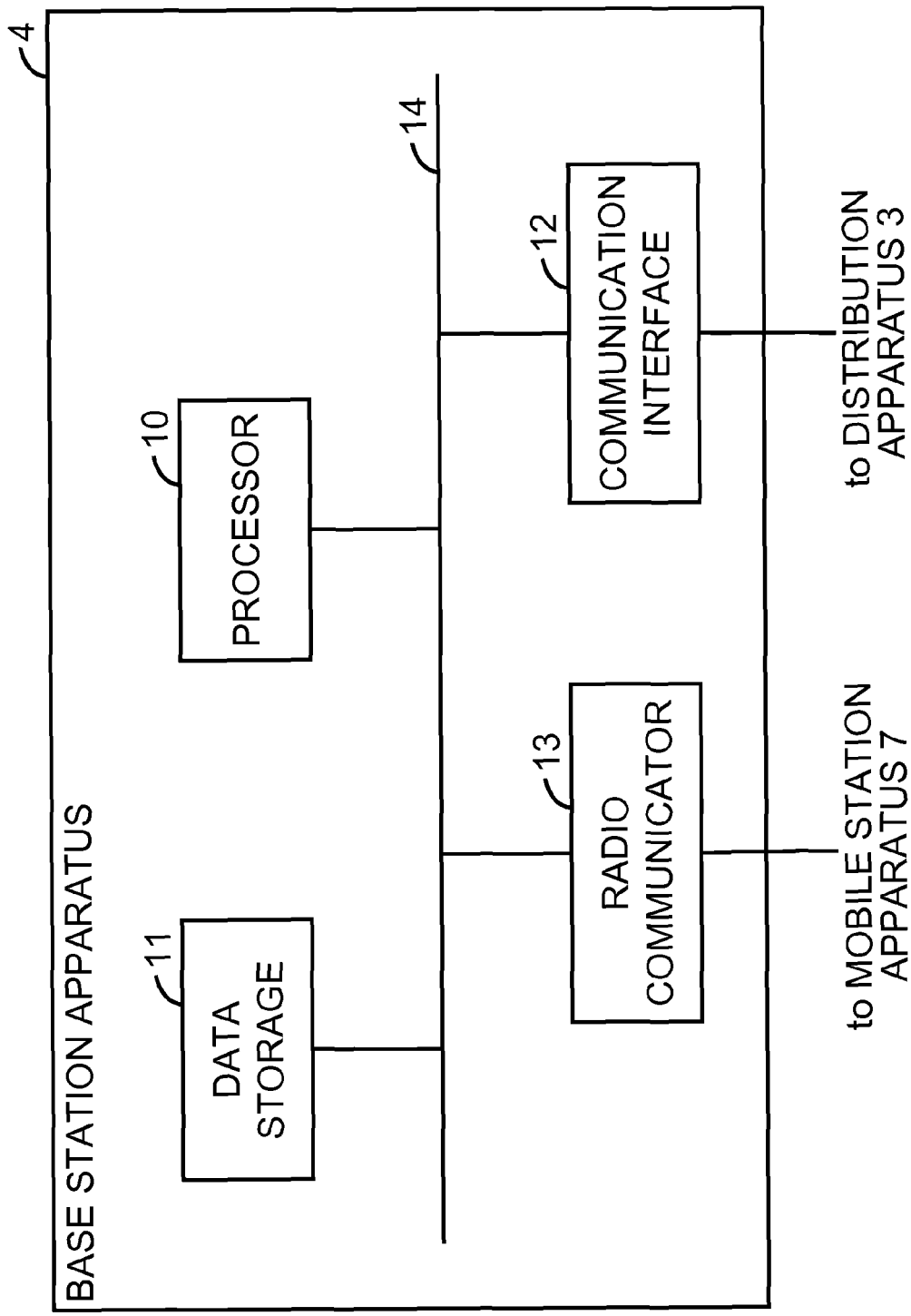
FIG. 2 is a diagram illustrating an exemplary hardware configuration of a base station apparatus according to an embodiment of the present invention.

FIG. 2 illustrates a first exemplary hardware configuration of the base station apparatus 4 illustrated in FIG. 1. The base station apparatus 4 includes a processor 10, a data storage 11, a communication interface 12, a radio communicator 13, and a bus 14. The processor 10, the data storage 11, the communication interface 12, and the radio communicator 13 are connected to each other through the bus 14 for transferring data.

The data storage 11 stores various computer programs and data for controlling operations of the base station apparatus 4. The data storage 11 may include a storage device (such as a memory) and an auxiliary storage device (such as a hard disk). The processor 10 is a data processing device. The processor 10 executes the programs stored in the data storage 11 to implement various types of processing for controlling the operations of the base station apparatus 4.

The communication interface 12 performs a process of communication between the base station apparatus 4 and an upstream apparatus of the base station apparatus 4. The radio communicator 13 performs a process of radio communication between the base station apparatus 4 and the mobile station apparatus 7. The hardware configuration illustrated in FIG. 2 is an exemplary hardware configuration of the base station apparatus 4. The base station apparatus 4 may adopt any of various types of hardware configurations as long as processes discussed below may be performed.

Figure 3:
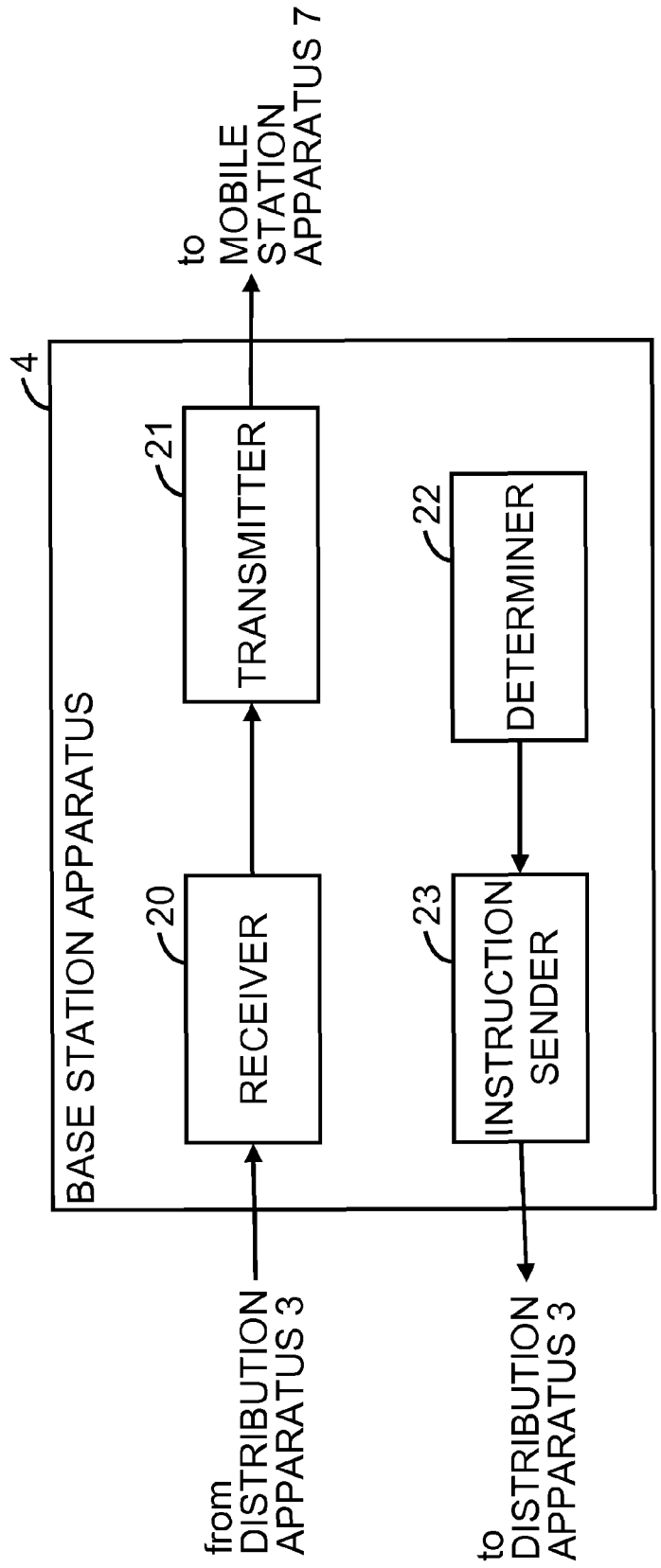
FIG. 3 is a diagram illustrating an exemplary functional configuration of a base station apparatus according to an embodiment of the present invention.

FIG. 3 illustrates an exemplary functional configuration of the base station apparatus 4 illustrated in FIG. 2. Functions of constituent elements illustrated in FIG. 3 are achieved by causing the processor 10 to execute the programs stored in the data storage 11. In FIG. 3, the functions that are related to the present embodiment are mainly illustrated.

The base station apparatus 4 includes a receiver 20, a transmitter 21, a determiner 22 and an instruction sender 23. The receiver 20 receives a multicast signal from an upstream apparatus of the base station apparatus 4. The transmitter 21 transmits the received multicast signal to the mobile station apparatus 7.

The determiner 22 determines, in accordance with the status of communication between the base station apparatus 4 and the mobile station apparatus 7, whether it is necessary to transmit the multicast signal to the mobile station apparatus 7. The determiner 22 may determine, in accordance with a parameter (radio communication parameter) related to radio communication between the base station apparatus 4 and the mobile station apparatus 7, whether it is necessary to transmit the multicast signal to the mobile station apparatus 7. The radio communication parameter may be a parameter related to the quality of communication between the base station apparatus 4 and the mobile station apparatus 7. The radio communication parameter may be a parameter that indicates a modulation scheme, a transfer rate or the like, which is employed for communication between the base station apparatus 4 and the mobile station apparatus 7.

The determiner 22 may determine, in accordance with a service status of the mobile station apparatus 7, whether it is necessary to transmit the multicast signal to the mobile station apparatus 7.

The instruction sender 23 transmits an instruction signal to the distributor 3 in accordance with the result of the determination made by the determiner 22. In this case, the instruction signal instructs the distributor 3 to join or not to join the group of destinations of the multicast signal.

Figure 4:
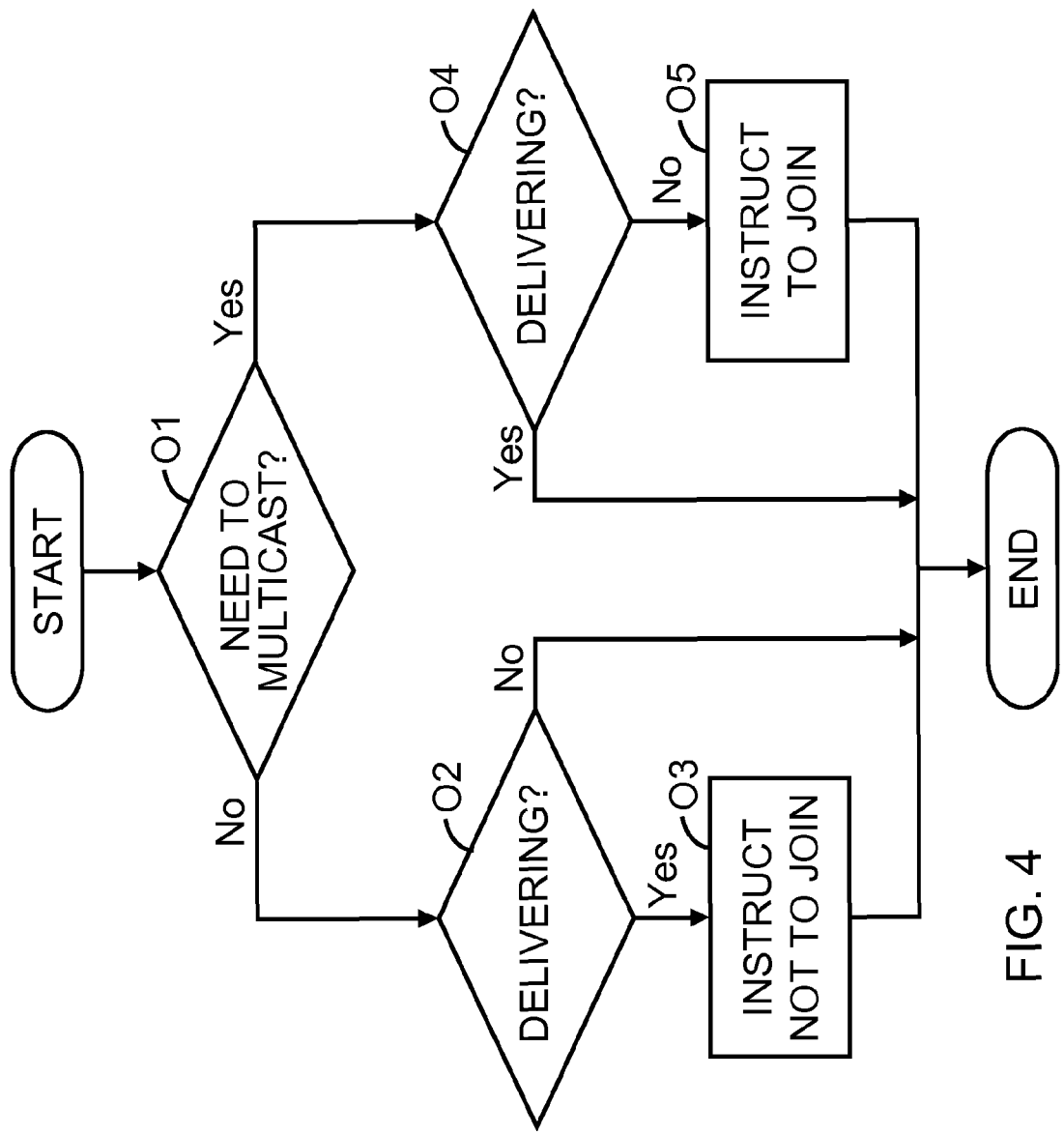
FIG. 4 is a diagram illustrating an exemplary operation flow of a base station apparatus according to an embodiment of the present invention.

FIG. 4 illustrates an exemplary operation flow of the base station apparatus 4 illustrated in FIG. 2. In operation O1, the determiner 22 determines, in accordance with the status of communication between the base station apparatus 4 and the mobile station apparatus 7, whether it is necessary to transmit the multicast signal to the mobile station apparatus 7. When it is not necessary to transmit the multicast signal to the mobile station apparatus 7 ("No" in operation O1), the base station apparatus 4 advances the process to operation O2. When it is necessary to transmit the multicast signal to the mobile station apparatus 7 ("Yes" in operation O1), the base station apparatus 4 advances the process to operation O4.

In operation O2, the determiner 22 determines whether multicast delivery to the mobile station apparatus 7 is being performed. When the multicast delivery to the mobile station apparatus 7 is being performed ("Yes" in operation O2), the base station apparatus 4 advances the process to operation O3. When the multicast delivery to the mobile station apparatus 7 is not being performed ("No" in operation O2), the base station apparatus 4 terminates the process.

In operation O3, the instruction sender 23 transmits, to the distributor 3, an instruction signal that instructs the distributor 3 not to join the group of destinations of the multicast signal.

In operation O4, the determiner 22 determines whether the multicast delivery to the mobile station apparatus 7 is being performed. When the multicast delivery to the mobile station apparatus 7 is not being performed ("No" in operation O4), the base station apparatus 4 advances the process to operation O5. When the multicast delivery to the mobile station apparatus 7 is being performed ("Yes" in operation O4), the base station apparatus 4 terminates the process.

In operation O5, the instruction sender 23 transmits, to the distributor 3, an instruction signal that instructs the distributor 3 to join the group of destinations of the multicast signal.

Figure 5:
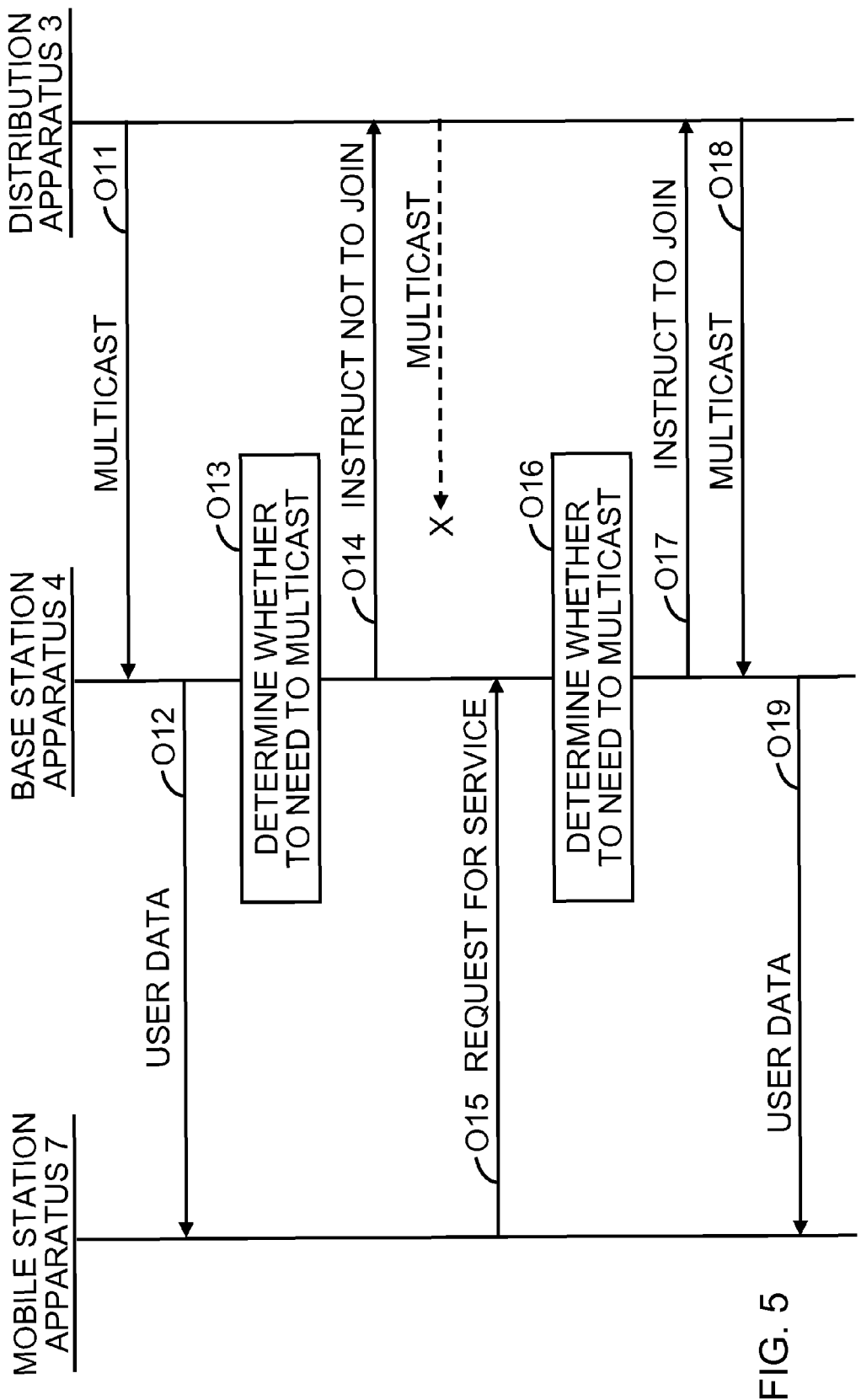
FIG. 5 is a sequence diagram illustrating an example of controlling a multicast signal in a communication system according to an embodiment of the present invention.

FIG. 5 illustrates a first example of controlling the multicast signal in the communication system illustrated in FIG. 1.

In operation O11, the distributor 3 transmits user data to the mobile station apparatus 7 through multicast delivery. The user data is received by the base station apparatus 4. In operation O12, the base station apparatus 4 transmits the user data to the mobile station apparatus 7.

In operation O13, the base station apparatus 4 determines whether it is necessary to transmit the multicast signal to the mobile station apparatus 7 in accordance with the status of communication between the base station apparatus 4 and the mobile station apparatus 7. When the base station apparatus 4 determines that it is not necessary to transmit the multicast signal in operation O13, the base station apparatus 4 transmits, to the distributor 3, an instruction signal that instructs the distributor 3 not to join the group of destinations of the multicast signal in operation O14. As a result, the distributor 3 stops transmitting the user data to the mobile station apparatus 7 through multicast delivery.

In operation O15, the mobile station apparatus 7 transmits a request for a service involving multicast delivery. Then, the base station apparatus 4 determines, in accordance with the status of communication between the base station apparatus 4 and the mobile station apparatus 7, whether it is necessary to transmit the multicast signal to the mobile station apparatus 7 in operation O16.

When the base station apparatus 4 determines that it is necessary to transmit the multicast signal in operation O16, the base station apparatus 4 transmits, to the distributor 3, an instruction signal that instructs the distributor 3 to join the group of destinations of the multicast signal in operation O17. As a result, the distributor 3 transmits user data to the mobile station apparatus 7 through multicast delivery in operation O18. The user data is received by the base station apparatus 4. In operation O19, the base station apparatus 4 transmits the user data to the mobile station apparatus 7.

According to the present embodiment, the base station apparatus 4 determines whether it is necessary to transmit the multicast signal to the mobile station apparatus 7 in accordance with the status of communication between the base station apparatus 4 and the mobile station apparatus 7, and the base station apparatus 4 controls delivery of the multicast signal to the mobile station apparatus 7. Thus, it is possible to perform delivery control quicker than that performed by conventional techniques. It is also possible to prevent the use efficiency of the network from being reduced owing to unnecessary traffic of multicast signals in the network.

Figure 6:
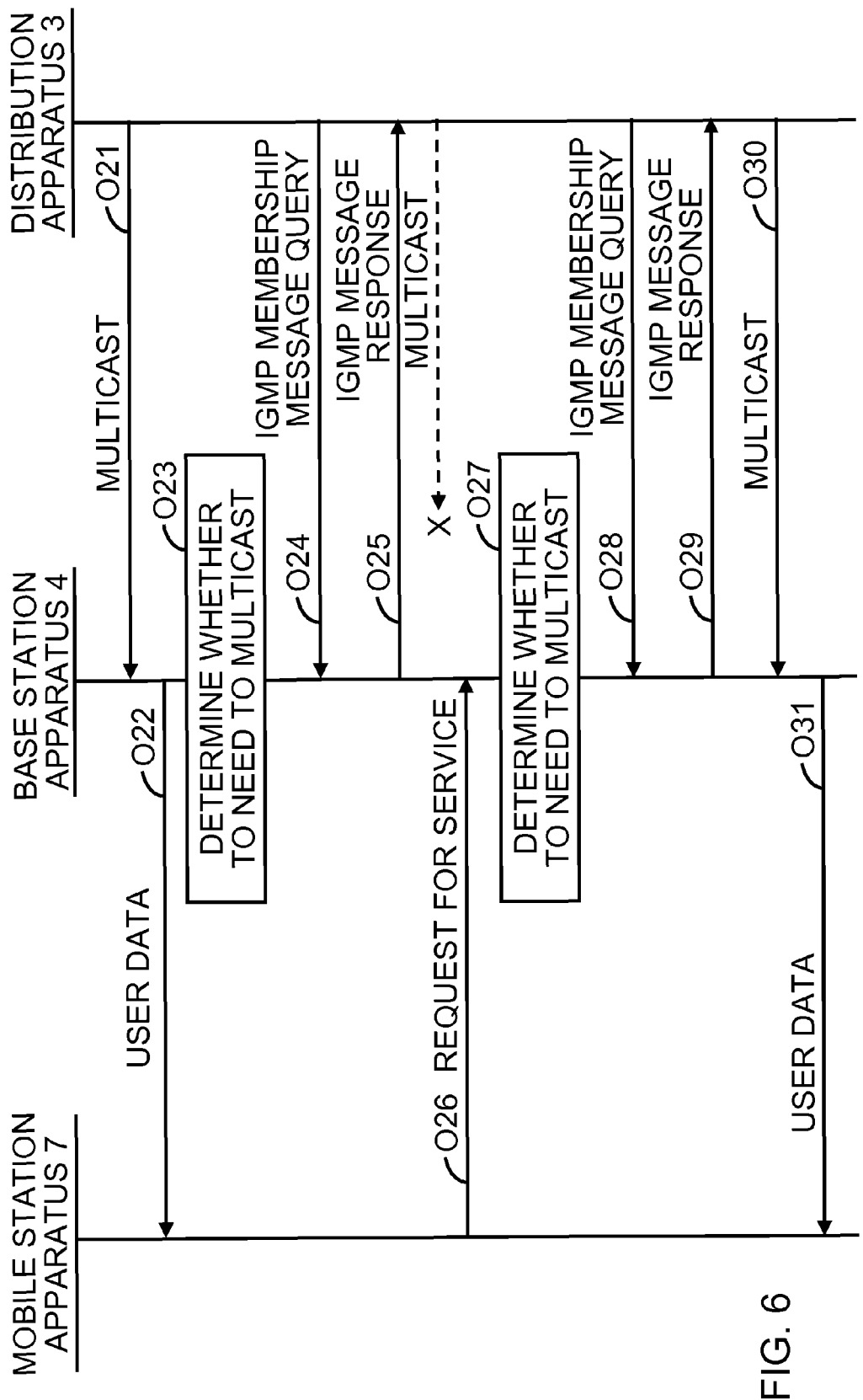
FIG. 6 is a sequence diagram illustrating an example of controlling a multicast signal in a communication system according to an embodiment of the present invention.

FIG. 6 is a sequence diagram illustrating a second example of controlling the multicast signal in the communication system illustrated in FIG. 1. In the present embodiment, the base station apparatus 4 notifies the distributor 3 of whether to join the group of destinations of the multicast signal through the Internet Group Management Protocol (IGMP).

In operation O21, the distributor 3 transmits user data to the mobile station apparatus 7 through multicast delivery. The user data is received by the base station apparatus 4. In operation O22, the base station apparatus 4 transmits the user data to the mobile station apparatus 7. In operation O23, the base station apparatus 4 determines whether it is necessary to transmit the multicast signal to the mobile station apparatus 7 in accordance with the status of communication between the base station apparatus 4 and the mobile station apparatus 7. The following will discuss the case in which the base station apparatus 4 determines that it is not necessary to transmit the multicast signal to the mobile station apparatus 7 in operation O23.

In operation O24, the distributor 3 transmits an IGMP membership message query to the base station apparatus 4. In operation O25, the base station apparatus 4 transmits, to the distributor 3, an IGMP message response that instructs the distributor 3 to leave the multicast group, while specifying at least one of the multicast group and the delivery source of the multicast delivery to the mobile station apparatus 7. As a result, the distributor 3 stops transmitting the user data to the mobile station apparatus 7 through multicast delivery.

In operation O26, the mobile station apparatus 7 transmits a request for a service involving multicast delivery. Then, the base station apparatus 4 determines, in accordance with the status of communication between the base station apparatus 4 and the mobile station apparatus 7, whether it is necessary to transmit the multicast signal to the mobile station apparatus 7 in operation O27. The following will discuss the case in which the base station apparatus 4 determines that it is necessary to transmit the multicast signal to the mobile station apparatus 7 in operation O27.

In operation O28, the distributor 3 transmits an IGMP membership message query to the base station apparatus 4. In operation O29, the base station apparatus 4 transmits, to the distributor 3, an IGMP message response that instructs the distributor 3 to join the multicast group, while specifying at least one of the multicast group and the delivery source of the multicast delivery to the mobile station apparatus 7.

In operation O30, the distributor 3 transmits user data to the mobile station apparatus 7 through multicast delivery. The user data is received by the base station apparatus 4. In operation O31, the base station apparatus 4 transmits the user data to the mobile station apparatus 7.

In the conventional techniques, in order to transmit user data to the mobile station apparatus 7 through multicast delivery, the delivery apparatus 2 performs the delivery control in the application layer. In the present embodiment, however, the base station apparatus 4 and the distributor 3 may control the delivery of the multicast signal through processing in the transport layer. It is, therefore, possible to accelerate the delivery control. In other examples discussed later, IGMP may also be used to notify the distributor 3 of whether to join the group of destinations of the multicast signal.

Figure 7:
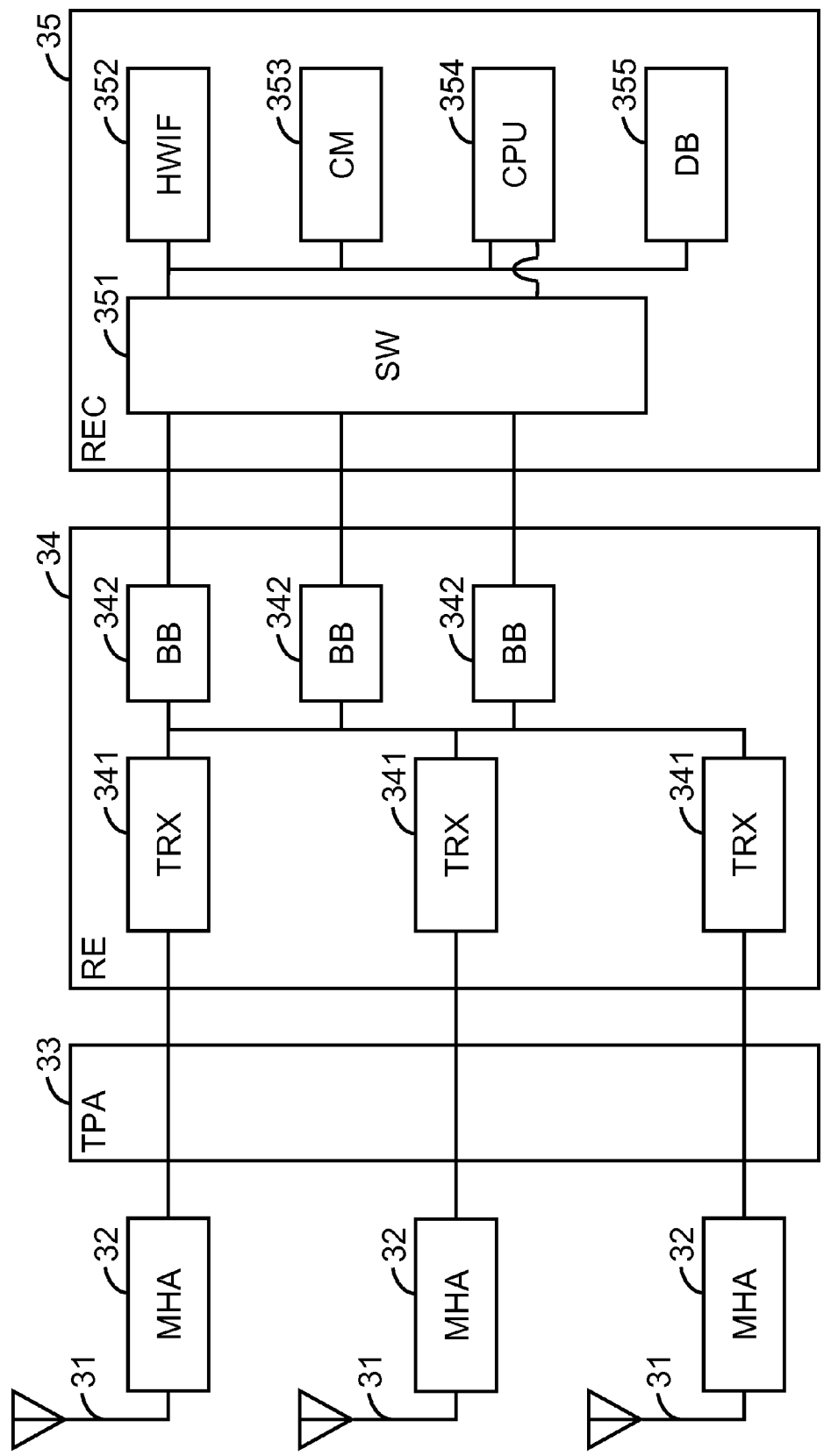
FIG. 7 is a diagram illustrating an exemplary hardware configuration of a base station apparatus according to an embodiment of the present invention.

FIG. 7 illustrates a second exemplary hardware configuration of the base station apparatus 4 illustrated in FIG. 1. The base station apparatus 4 includes one or more antennas 31, one or more mast head amplifiers (MHAs) 32, a transmit power amplifier (TPA) 33, a radio equipment (RE) 34 and a radio equipment controller (REC) 35.

The RE 34 includes one or more transmitter receivers (TRXs) 341 and one or more baseband units (BBs) 342.

The REC 35 includes a switch (SW) 351, a highway interface (HWIF) 352, a common memory (CM) 353, a call processing unit (CPU) 354 and a database unit (DB) 355.

The antenna 31 is a radio interface that transmits and receives a radio signal to and from the mobile station apparatus 7. The MHA 32 amplifies a radio signal transferred between the antenna 31 and the TPA 33. The TPA 33 amplifies a radio signal transferred between the MHA 32 and the RE 34.

In the RE 34, the TRX 341 converts a baseband signal received from the BB 342 into a radio frequency signal and transmits the radio frequency signal to the TPA 33. The TRX 341 converts a radio frequency signal received from the TPA 33 into a baseband signal and transmits the baseband signal to the BB 342. The BB 342 performs baseband processing (including predetermined encoding and predetermined modulation) on a signal received from the SW 351 of the REC 35 and transmits the signal resulted from the baseband processing to the TRX 341. The BB 342 performs baseband processing (including predetermined demodulation and predetermined decoding) on a baseband signal received from the TRX 341 and transmits the signal resulted from the baseband processing to the SW 351 of the REC 35.

In the REC 35, the SW 351 switches connections between the BBs 342 and the HWIF 352 in accordance with control performed by the CPU 354. The SW 351 outputs a signal received from any of the BBs 342 to the HWIF 352 and outputs a signal received from the HWIF 352 to any of the BBs 342.

The HWIF 352 communicates with an upstream apparatus of the base station apparatus 4 and another base station apparatus 4. For example, when the LTE is employed in the communication system 1, the HWIF 352 functions as an S1 interface and an X2 interface and communicates with another base station apparatus, a mobility management entity (MME) and an S-GW.

The CM 353 stores data used for operations of the CPU 354. For example, data may be read from the DB 355 and expanded on the CM 353 in some cases. The CPU 354 controls the SW 351 in accordance with either or both the data stored in the CM 353 and data stored in the DB 355. The data stored in the CM 353 and/or the data stored in the DB 355 includes application data and setting data for call control, and is referenced by the CPU 354. The CPU 354 controls the SW 351 such that a signal transferred between the base station apparatus 4 and at least one of the mobile station apparatus 7, another base station apparatus 4, and an upstream apparatus of the base station apparatus 4 is transferred to an appropriate path. The DB 355 stores data used for operations of the base station apparatus 4.

Figure 8:
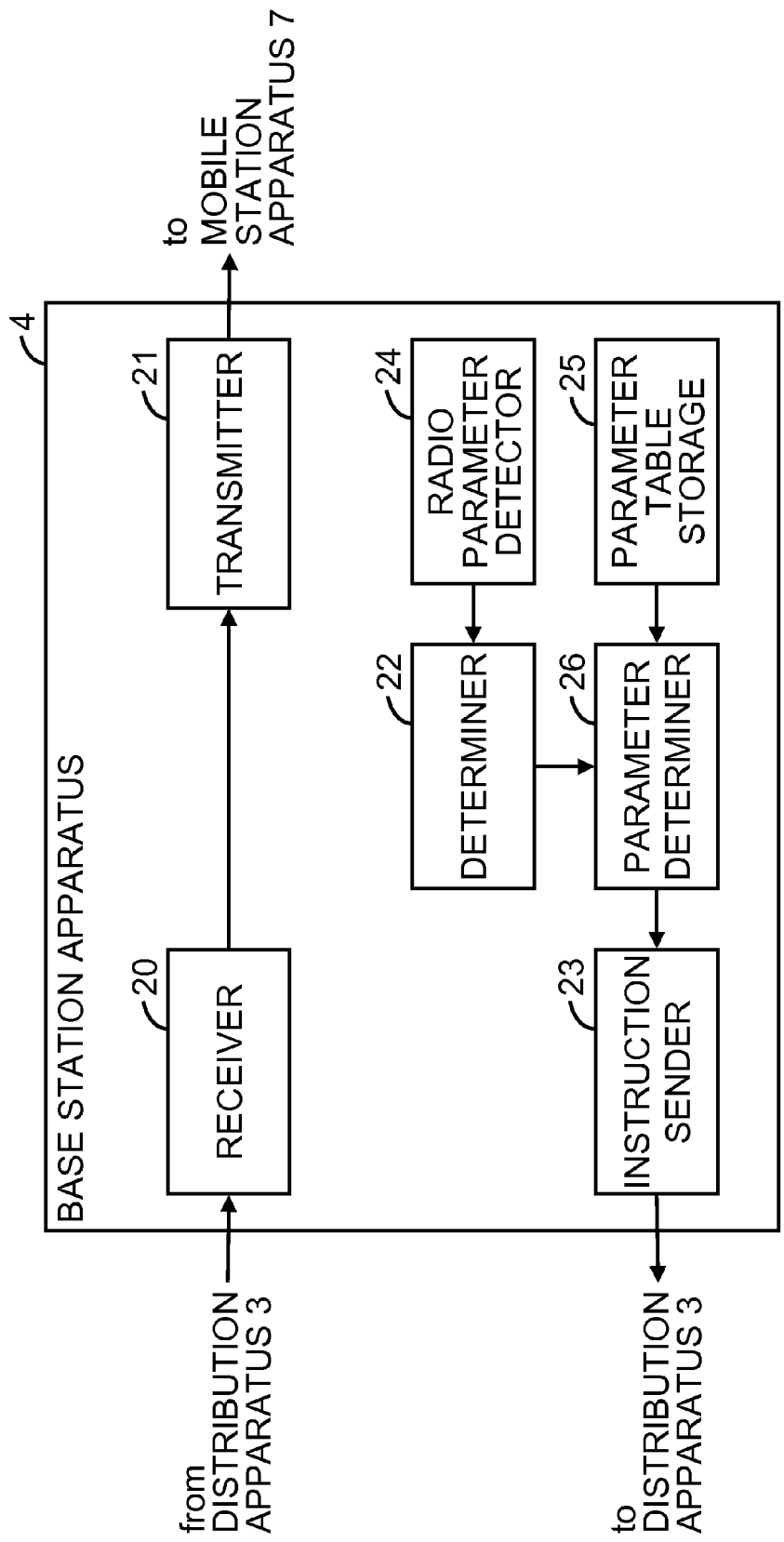
FIG. 8 is a diagram illustrating an exemplary functional configuration of a base station apparatus according to an embodiment of the present invention.

FIG. 8 illustrates a first exemplary functional configuration of the base station apparatus 4 illustrated in FIG. 7. The base station apparatus 4 illustrated in FIG. 8 includes the receiver 20, the transmitter 21, the determiner 22, the instruction sender 23, a radio parameter detector 24, a parameter table storage 25 and a parameter determiner 26. In FIG. 8, elements similar to those illustrated in FIG. 3 are indicated by reference numerals similar to those in FIG. 3. In FIG. 8, the functions that are related to the present embodiment are mainly illustrated.

The function of the receiver 20 is performed by the HWIF 352 illustrated in FIG. 7. The function of the transmitter 21 is performed by the TRX 341 illustrated in FIG. 7. The function of the determiner 22 may be performed by the CPU 354 illustrated in FIG. 7. The function of the instruction sender 23 is performed by the HWIF 352 illustrated in FIG. 7.

The radio parameter detector 24 detects a radio communication parameter for each of cells 8 in which radio communication is performed between the base station apparatus 4 and mobile station apparatuses 7. The function of the radio parameter detector 24 is performed by the BB 342 illustrated in FIG. 7. A parameter table is stored in the parameter table storage 25. The parameter table indicates information on a correspondence relationship between each of the cells 8 and a multicast group for transmitting user data to a mobile station apparatus 7 located within the cell 8.

FIG. 9 illustrates a first example of the parameter table according to the present embodiment. Each record of the parameter table includes a "cell" field 251, an "IP address" field 252, a "group" field 253 and a "delivery status" field 254. The parameter table includes at least one record for each of the cells 8. The "cell" field 251 stores an identifier of an interested cell 8 covered by the base station apparatus 4. The "IP address" field 252 stores an IP address of the delivery apparatus 2 that multicasts user data to mobile station apparatuses 7 located within the interested cell 8.

The "group" field 253 stores an identifier of a multicast group for delivering user data to mobile station apparatuses 7 located within the interested cell 8. The "delivery status" fields 254 stores a flag that indicates whether multicast delivery is being performed for a multicast group associated with the interested cell 8 in the parameter table.

For example, a record 40 indicates that the identifier of a multicast group for multicasting user data to mobile station apparatuses located within a cell with an identifier "cell_1" is "AAA", and that the IP address of an interested delivery apparatus is "aaa". The record 40 indicates that multicast delivery of user data is being performed to the mobile station apparatuses, which belong to the multicast group with the identifier "AAA", located within the cell with the identifier "cell_1".

For example, a record 41 indicates that the identifier of a multicast group for multicasting user data to mobile station apparatuses located within a cell with an identifier "cell_2" is "CCC", and that the IP address of an interested delivery apparatus is "ccc". The record 41 indicates that multicast delivery of user data is not being performed to the mobile station apparatuses, which belong to the multicast group with the identifier "CCC", located within the cell with the identifier "cell_2".

The parameter table storage 25 may be the CM 353 or the DB 355. The parameter table storage 25 may be provided outside the base station apparatus 4 as long as the base station apparatus 4 may access the parameter table storage 25. When the base station apparatus 4 notifies, through IGMP, the distributor 3 of whether to join the group of destinations of the multicast signal, the address of the multicast group may be stored in the "group" field 253 as the identifier of the multicast group.

Referring back to FIG. 8, the parameter determiner 26 determines, in accordance with the result of the determination made by the determiner 22, a parameter for an instruction signal to be transmitted by the instruction sender 23. The parameter determined by the parameter determiner 26 may be the identifier of the multicast group regarding which the base station apparatus 4 requests the distributor 3 to join or leave, the IP address of the delivery apparatus, or identification information identifying joining or leaving the multicast group. The function of the parameter determiner 26 may be performed by the CPU 354 illustrated in FIG. 7. The function of the determiner 22 and the function of the parameter determiner 26 may not be performed by the CPU 354 and may be performed by a processor that is provided independently from the CPU 354.

Figure 10:
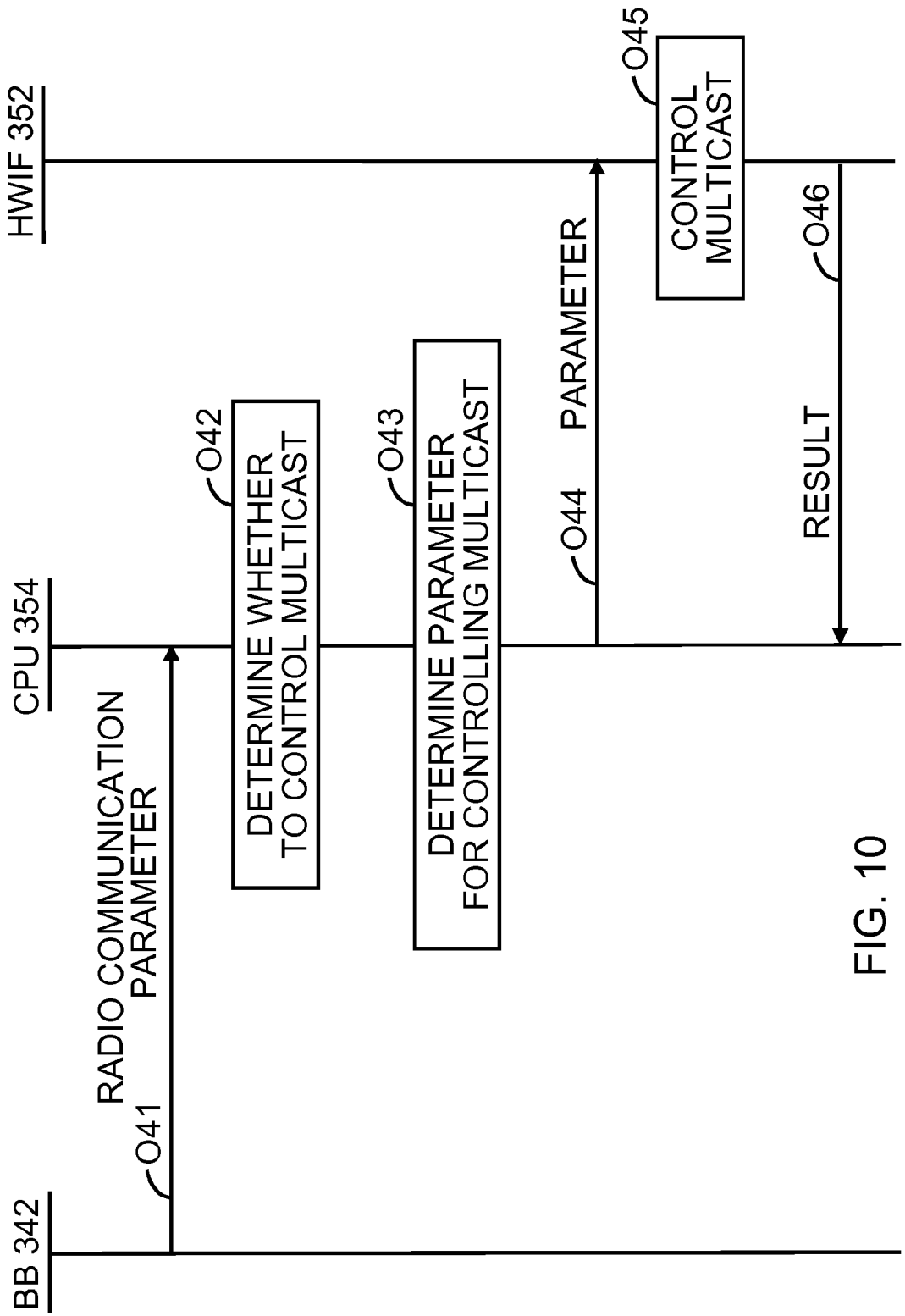
FIG. 10 is a sequence diagram illustrating an exemplary operation sequence of a base station apparatus according to an embodiment of the present invention.

FIG. 10 illustrates a first exemplary operation sequence of the base station apparatus 4 illustrated in FIG. 7. In operation O41, the BB 342 detects a radio communication parameter and notifies the CPU 354 of the radio communication parameter.

In operation O42, the CPU 354 determines, in accordance with the notified radio communication parameter, whether it is necessary to control multicast delivery. When the CPU 354 determines that it is necessary to control multicast delivery in operation O42, the CPU 354 determines a parameter for an instruction signal to be transmitted to the distributor 3 in operation O43.

In operation O44, the CPU 354 notifies the HWIF 352 of the parameter determined in operation O43. In operation O45, the HWIF 352 controls multicast delivery by transmitting the instruction signal to the distributor 3 in accordance with the notified parameter. In operation O46, the HWIF 352 notifies the CPU 354 of the result of the control performed by the HWIF 352.

Figure 11:
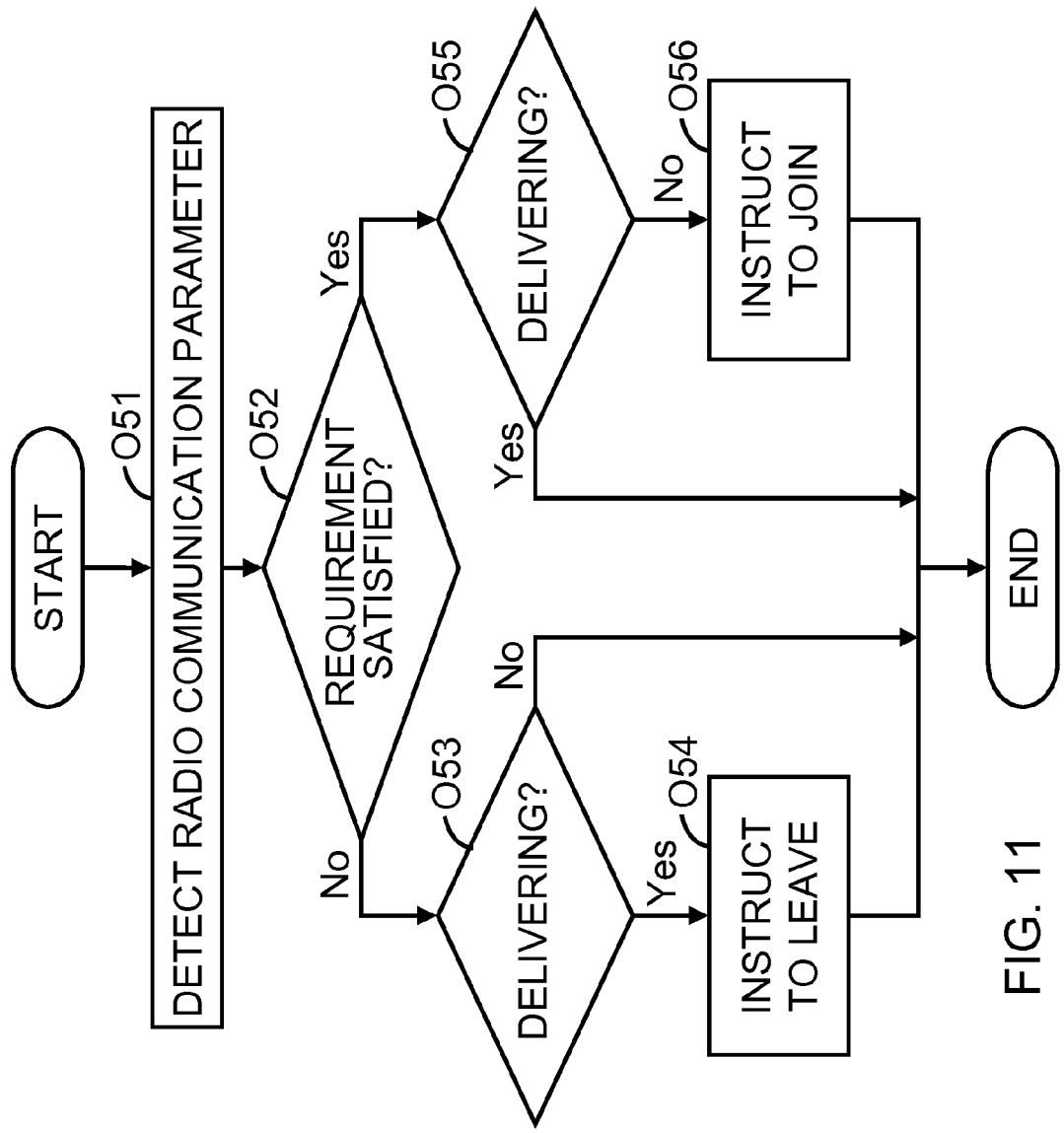
FIG. 11 is a diagram illustrating an exemplary operation flow of a base station apparatus according to an embodiment of the present invention.

FIG. 11 illustrates a first exemplary operation flow of the base station apparatus 4 illustrated in FIG. 7. The present embodiment illustrated in FIG. 11 discusses the case in which a parameter related to the quality of the communication is used as a radio communication parameter for each of the cells 8 where radio communication is performed between the base station apparatus 4 and the mobile station apparatuses. However, other indexes may be used as the radio communication parameters.

In the following discussion, a rate of occurrence of cyclic redundancy check (CRC) errors in the automatic repeat request (ARQ) protocol is used as the parameter related to the quality of the communication. However, the rate of CRC errors received by a radio link control protocol data unit (RLCPDU), a block error rate (BLER), or a bit error ratio (BER) may be used as the parameter related to the quality of the communication.

In operation O51, the radio parameter detector 24 calculates the rate (to be used as the radio communication parameter) of occurrence of CRC errors in ARQ as the radio communication parameter for an interested cell in accordance with the following equation (1).

Rate of occurrence of CRC errors in ARQ (%)= (Number of received CRC errors)/(Number of samples)×100    (1)

In operation O52, the determiner 22 determines whether the calculated rate of occurrence of CRC errors in ARQ satisfies a predetermined requirement related to the radio communication parameter. The predetermined requirement is expressed by the following equation (2).

Rate of occurrence of CRC errors in ARQ−Determination threshold≤0    (2)

When the predetermined requirement expressed by the equation (2) is not satisfied ("No" in operation O52), the determiner 22 determines that it is not necessary to perform multicast delivery since the quality of radio communication for multicast delivery is not ensured for the interested cell. Then, the base station apparatus 4 advances the process to operation O53. When the predetermined requirement expressed by the equation (2) is satisfied ("Yes" in operation O52), the determiner 22 determines that it is necessary to perform multicast delivery, and the base station apparatus 4 advances the process to operation O55.

In operation O53, the determiner 22 determines, by accessing a function of searching data in the parameter table, whether multicast delivery is being performed for a multicast group associated to the interested cell. When multicast delivery is being performed ("Yes" in operation O53), the base station apparatus 4 advances the process to operation O54. When multicast delivery is not being performed ("No" in operation O53), the base station apparatus 4 terminates the process.

In operation O54, the parameter determiner 26 determines, by accessing the function of searching data in the parameter table, a parameter for an instruction signal that instructs the distributor 3 to leave the multicast group for performing multicast delivery in the interested cell. The instruction sender 23 transmits the instruction signal to the distributor 3 in accordance with the parameter determined by the parameter determiner 26.

In operation O55, the determiner 22 determines, by accessing the function of searching data in the parameter table, whether multicast delivery is being performed for the multicast group associated to the interested cell. When the determiner 22 determines that multicast delivery is not being performed ("No" in operation O55), the base station apparatus 4 advances the process to operation O56. When the determiner 22 determines that multicast delivery is being performed ("Yes" in operation O55), the base station apparatus 4 terminates the process.

In operation O56, the parameter determiner 26 determines, by accessing the function of searching data in the parameter table, a parameter for an instruction signal that instructs the distributor 3 to join the multicast group for performing multicast delivery in the interested cell. The instruction sender 23 transmits the instruction signal to the distributor 3 in accordance with the parameter determined by the parameter determiner 26.

According to the present embodiment, it is possible to control multicast delivery using a radio communication parameter that may be calculated by the base station apparatus 4 for each of the cells.

Figure 12:
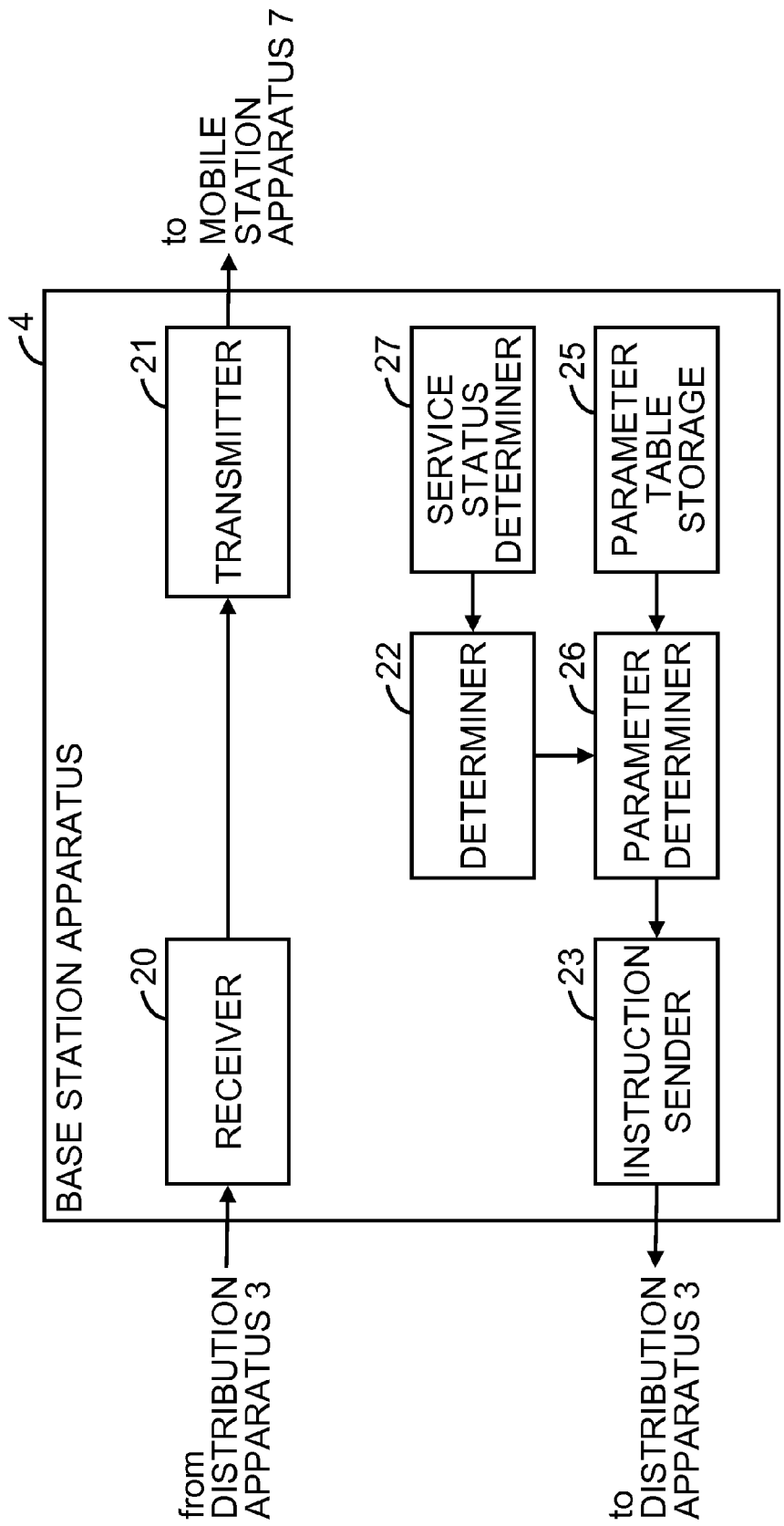
FIG. 12 is a diagram illustrating an exemplary functional configuration of a base station apparatus according to an embodiment of the present invention.

FIG. 12 illustrates a second exemplary functional configuration of the base station apparatus 4 illustrated in FIG. 7. The base station apparatus 4 illustrated in FIG. 12 includes the receiver 20, the transmitter 21, the determiner 22, the instruction sender 23, the parameter table storage 25, the parameter determiner 26 and a service status determiner 27. In FIG. 12, elements similar to those illustrated in FIG. 8 are indicated by reference numerals similar to those in FIG. 8. In FIG. 12, functions that are related to the present embodiment are mainly illustrated.

The service status determiner 27 determines service status of mobile station apparatuses 7 connected to the base station apparatus 4. The function of the service status determiner 27 may be performed by the CPU 354 illustrated in FIG. 7. The function of the service status determiner 27 may not be performed by the CPU 354 and may be performed by a processor that is provided independently from the CPU 354.

FIG. 13 illustrates a second example of the parameter table according to the present embodiment. Each record of the parameter table includes a "mobile station" field 255, an "IP address" field 252, a "group" field 253 and a "delivery status" field 254. The parameter table includes at least one record for each of the mobile station apparatuses. The "mobile station" field 255 stores an identifier of a mobile station apparatus connected to the base station apparatus 4. The "IP address" field 252 stores an IP address of the delivery apparatus 2 that transmits user data to the interested mobile station apparatus 7 through multicast delivery.

The "group" field 253 stores an identifier of a multicast group for delivering user data to the interested mobile station apparatus 7. The "delivery status" field 254 stores a flag that indicates whether multicast delivery is being performed for a multicast group associated with the interested mobile station apparatus 7 in the parameter table.

For example, a record 42 indicates that the identifier of a multicast group for delivering user data to a mobile station apparatus with an identifier "UE_1" through multicast delivery is "AAA", and that the IP address of an interested delivery apparatus is "aaa". The record 42 indicates that multicast delivery of user data is being performed to the mobile station apparatus with the identifier "UE_1", which belongs to the multicast group with the identifier "AAA".

For example, a record 43 indicates that the identifier of a multicast group for delivering user data to a mobile station apparatus with an identifier "UE_2" through multicast delivery is "CCC", and that the IP address of an interested delivery apparatus is "ccc". The record 43 indicates that multicast delivery of user data is not being performed to the mobile station apparatus with the identifier "UE_2", which belongs to the multicast group with the identifier "CCC".

Figure 14:
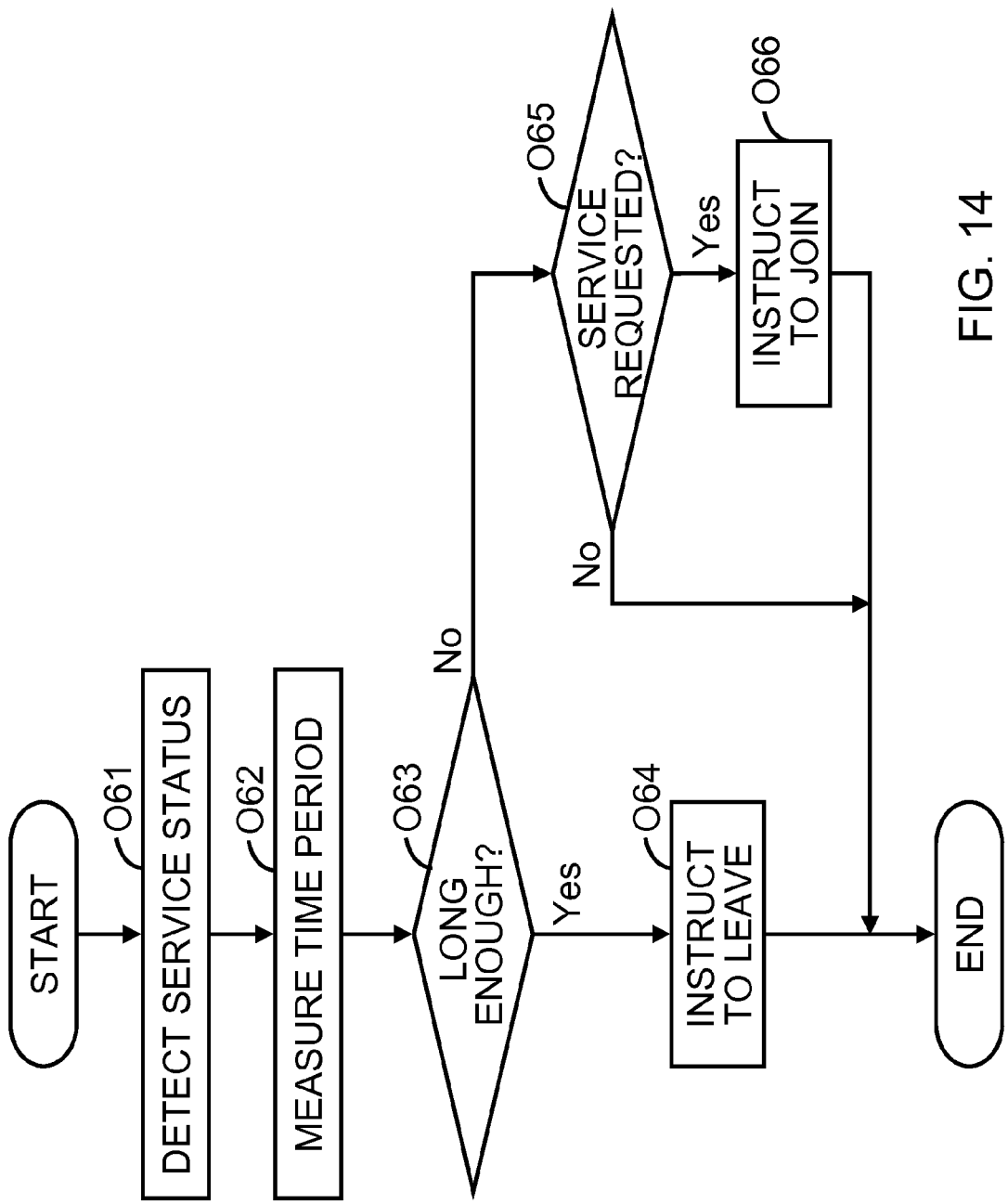
FIG. 14 is a diagram illustrating an exemplary operation flow of a base station apparatus according to an embodiment of the present invention.

FIG. 14 illustrates a second exemplary operation flow the base station apparatus 4 illustrated in FIG. 7. The present embodiment illustrated in FIG. 14 discusses the case in which a discontinuous reception (DRX) state defined in the LTE is used as a service status of the mobile station apparatus 7. However, another status may be used as the service status of the mobile station apparatus 7 as long as whether it is necessary to transmit data to the mobile station apparatus 7 may be determined in accordance with the status.

In operation O61, the service status determiner 27 detects the service status of the mobile station apparatus 7. In operation O62, the service status determiner 27 measures a time period for which the service status of the mobile station apparatus 7 is the DRX state.

In operation O63, the determiner 22 determines whether the time period for which the service status of the mobile station apparatus 7 is the DRX state is long enough, that is, the time period is equal to or longer than a predetermined time period. When the service status of the mobile station apparatus 7 is the DRX state for the predetermined time period or more ("Yes" in operation O63), the determiner 22 determines that it is not necessary to perform multicast delivery, and the base station apparatus 4 advances the process to operation O64. When the service status of the mobile station apparatus 7 is the DRX state for less than the predetermined time period ("No" in operation O63), the determiner 22 that it is necessary to perform multicast delivery, and the base station apparatus 4 advances the process to operation O65.

In operation O64, the parameter determiner 26 determines, by accessing the function of searching data in the parameter table, a parameter for an instruction signal that instructs the distributor 3 to leave the multicast group for delivering user data to the interested mobile station apparatus through multicast delivery. The instruction sender 23 transmits the instruction signal to the distributor 3 in accordance with the parameter determined by the parameter determiner 26.

In operation O65, the determiner 22 determines whether the interested mobile station apparatus 7 has transmitted a request for a service involving multicast delivery. When the determiner 22 determines that the interested mobile station apparatus 7 has transmitted the request for the service ("Yes" in operation O65), the base station apparatus 4 advances the process to operation O66. When the determiner 22 determines that the interested mobile station apparatus 7 has not transmitted the request for the service ("No" in operation O65), the base station apparatus 4 terminates the process.

In operation O66, the parameter determiner 26 determines, by accessing the function of searching data in the parameter table, a parameter for an instruction signal that instructs the distributor 3 to join the multicast group for delivering data to the interested mobile station apparatus 7 through multicast delivery. The instruction sender 23 transmits the instruction signal to the distribution apparatus 3 in accordance with the parameter determined by the parameter determiner 26.

According to the present embodiment, it is possible to determine, in accordance with the service status of the mobile station apparatus 7, whether it is necessary to perform multicast delivery to control the multicast delivery.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A base station apparatus comprising:
   a memory; and
   a processor coupled to the memory and the processor configured to
   receive a multicast signal transmitted from a distribution apparatus, the multicast signal being to be transmitted to mobile station apparatuses belonging to a first multicast group;
   transmit the received multicast signal to mobile station apparatuses located within a cell covered by the base station apparatus;
   determine, in accordance with a service status of a first mobile station apparatus belonging to the first multicast group, whether multicast delivery to mobile station apparatuses belonging to the first multicast group is needed in the cell; and
   transmit to the distribution apparatus an instruction signal not to transmit a multicast signal for multicast delivery to mobile station apparatuses belonging to the first multicast group when it is determined that multicast delivery to mobile station apparatuses belonging to the first multicast group is not needed in the cell;
   wherein the processor is configured to
   detect the service status of the first mobile station apparatus, measure a time period for which the service status is a first state, determine whether the measured time period is equal to or longer than a predetermined time period, and determine, when the measured time period is equal to or longer than the predetermined time period, that the multicast delivery to mobile station apparatuses belonging to the first multi cast group is not needed in the cell;

wherein the first state is a Discontinuous Reception (DRX) state defined in Long Term Evolution (LTE).

2. A method for delivering a multicast signal, comprising:

receiving, by a base station apparatus, a multicast signal transmitted from a distribution apparatus, the multicast signal being to be transmitted to mobile station apparatuses belonging to a first multicast group;

transmitting, by the base station apparatus, the received multicast signal to mobile station apparatuses located within a cell covered by the base station apparatus;

determining by the base station apparatus, in accordance with a service status of a first mobile station apparatus belonging to the first multicast group, whether multicast delivery to mobile station apparatuses belonging to the first multicast group in the cell is needed in the cell;

transmitting to the distribution apparatus an instruction signal not to transmit a multicast signal for multicast delivery to mobile station apparatuses belonging to the first multicast group when it is determined that multicast delivery to mobile station apparatuses belonging to the first multicast group is not needed in the cell;

detecting the service status of the first mobile station apparatus;

measuring a time period for which the service status is a first state;

determining whether the measured time period is equal to or longer than a predetermined time period; and determining, when the measured time period is equal to or longer than the predetermined time period, that the multicast delivery to mobile station apparatuses belonging to the first multicast group is not needed in the cell;

wherein the first state is a Discontinuous Reception (DRX) state defined in Long Term Evolution (LTE).

* * * * *